Figure 1:
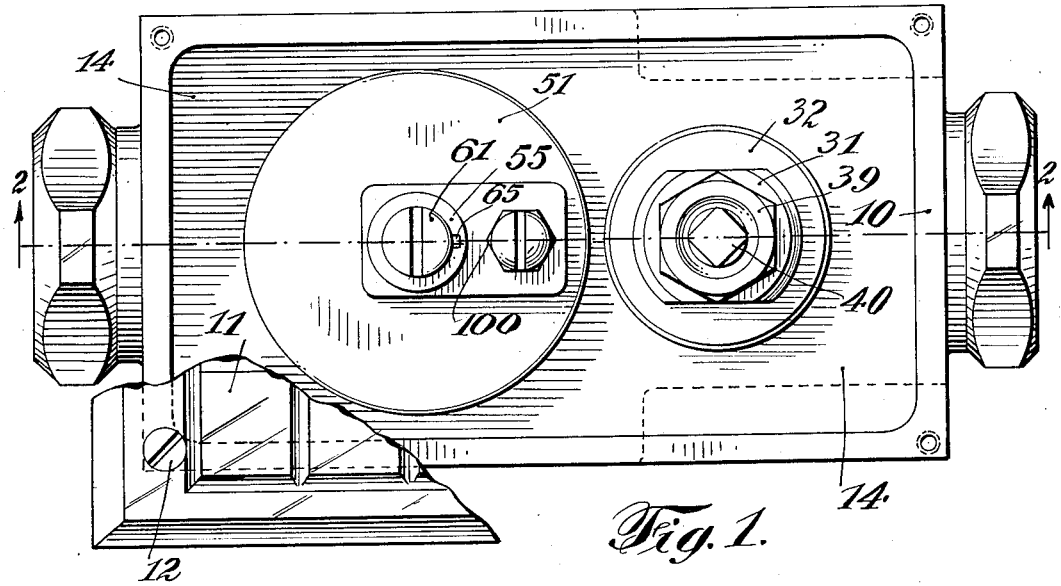

Oct. 8, 1935.  O. A. SORENSEN  2,016,460

VALVE ASSEMBLY

Filed July 14, 1934

INVENTOR
Otto A. Sorensen
BY Ramsey & Kent
his ATTORNEYS

Patented Oct. 8, 1935

2,016,460

UNITED STATES PATENT OFFICE 2,016,460

VALVE ASSEMBLY

Otto A. Sorensen, Lakeview, N. Y.

Application July 14, 1934, Serial No. 735,140

5 Claims. (Cl. 277—71)

This invention relates to valve assemblies and more particularly to assemblies of the character known generally as "floor valves".

An object of the invention is to provide a new, simple and efficient floor valve assembly having as a part thereof a self-closing valve.

Another object of the invention is to provide in a valve assembly of the foregoing type a pressure reduction valve for reducing the pressure of water supplied to a plumbing fixture.

Another object of the invention is to provide means for regulating the pressure reduction valve.

A further object of the invention is to provide a valve assembly in which all moving parts or parts subject to wear are removable and replaceable without disturbing the valve casing.

In carrying out the present invention, a valve casing of the type to be embedded in a floor is provided, and partitions are formed in this casing in such fashion as to divide a portion thereof into inlet, intermediate and outlet chambers. Openings are provided in the partitions to permit passage of water from the inlet chamber to the intermediate chamber and from the intermediate chamber to the outlet chamber. Removable valve seats are supplied for these openings. The partition which separates the chambers from the top compartment of the casing is provided with openings concentric with the valve seat openings, and into these openings are removably placed valve mechanism. In one opening the valve mechanism is in the nature of a pressure reduction valve normally held closed by a spring and opened only upon predetermined water pressure. This pressure reduction valve is capable of adjustment to compensate for various water pressures. In the other opening a self-closing valve mechanism is removably mounted, which mechanism consists of a valve cage carrying a valve member to seat on the removable seat between the intermediate and outlet chambers and a secondary valve member movable up and down relative to the cage. Water passes from the intermediate chamber into the cage and from the cage into an equalizing chamber, the pressure in which can be relieved by movement of the plunger valve. When this pressure in the equalizing chamber is relieved, the pressure of the water in the intermediate chamber opens the cage valve so that water can flow into the outlet chamber. When the plunger valve is released to close it, water again flows from the cage into the equalizing chamber causing a gradual closing of the cage valve. The communication between the cage and the equalizing chamber can be controlled, and in addition the height to which the cage rises can be controlled. All parts mounted within the casing are readily accessible by simply removing the cover plate of the casing after which any part can be removed and repaired or replaced.

Figure 2:
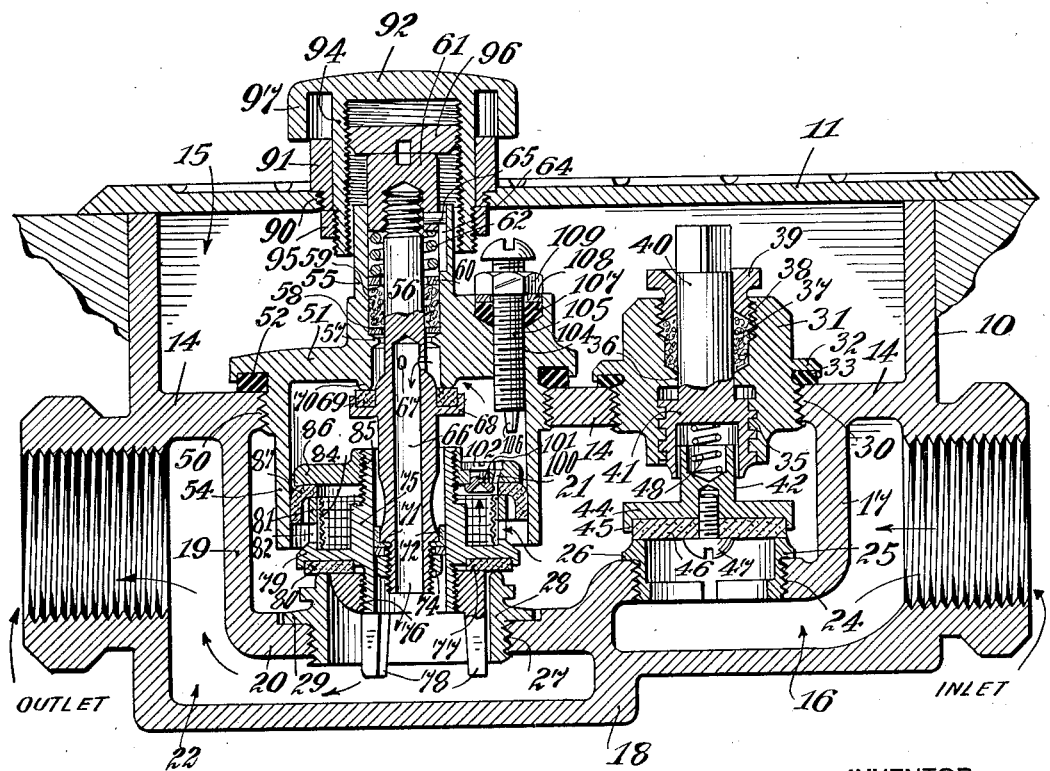

Other features, objects and advantages of the invention will be apparent from the following detailed description taken in connection with the accompanying drawing forming a part of the same wherein Fig. 1 is a plan view showing the top of the casing with part of the cover thereon; and Fig. 2 is a section taken substantially on the line 2—2 of Fig. 1.

Referring now to the drawing, 10 indicates an open top metallic casing which can be closed by a cover plate 11 by means of screws 12 passing through the cover plate and threaded into apertures in the wall of the casing. The casing is provided with a horizontal wall 14 dividing it into upper and lower compartments, the upper being indicated generally at 15. The lower compartment in turn is divided into an inlet chamber 16 by means of a wall 17 extending downwardly from the partition 14, then parallel with the partition 14 and then into connection with the bottom 18 of the casing. Another partition having a downwardly extending wall 19 has a portion 20 parallel to the partition 13 connected to the partition 17 to divide the remainder of the lower compartment into an intermediate chamber 21 and an outlet chamber 22. The portion of the wall 17 parallel to the partition 14 is provided with an aperture 24 screw-threaded for the reception of an annular valve seat 25 having a flange 26 resting on top of the wall. The part 20 of the wall 19 is provided with an aperture 27 screw-threaded for the reception of an annular valve seat 28 having a shoulder 29 resting on the top of the wall.

The partition 14 is provided with an aperture 30 concentric with aperture 20, and screw-threaded for the reception of a plug 31. The plug 31 has an annular flange 32, and packing 33 is positioned between the flange 32 and the top of the partition 14 to prevent leakage from the intermediate chamber 21 into the upper compartment 15 around the threaded joint between the wall of aperture 30 and the plug 31. The lower part of the plug 31 is hollowed out and provided with square threads 35. The intermediate portion of the plug 31 is hollowed out as at 36 while the portion thereabove is further hollowed out and enlarged for the reception of packing material 37. The upper part of the wall is threaded as at 38 for the reception of the threads of a packing compressor 39. A stem member 40 extends through compressor 39 through the intermediate portion 36 and has the lower end enlarged and threaded to fit the square threads 35. The top of the stem 40 may be squared or arranged in any suitable configuration to aid in rotating the stem. The enlarged lower end 41 of this stem is hollowed out for the reception of a stem 42 forming part of a flat valve cup 44. This cup 44 has an annular rim 45 which provides a retaining wall for a disk 46 of leather or some other suitable material for providing a water tight joint when the disk is seated against the top of the valve seat 25. The disk 46 is held to the cup 44 by means of a screw 47 passing through the disk into a threaded aperture in the cup. The end of the stem 42 is hollowed out so that a spring 48 may have a portion thereof resting in the hollowed out part with the remainder normally resting against the base of the hollowed out part of the lower end 41 of stem 40.

The partition 14 is provided with an opening 50 concentric with the opening 27 and having the wall thereof threaded for the reception of the threads of a valve guideway member 51. Packing 52 is positioned between the partition 14 and part of the member 51 to prevent leakage of fluid around the joints of the threads just mentioned. This member 51 has a tubular portion 54 which serves as a cylinder enclosing a valve cage to be described hereinafter. The member 51 has a stem portion 55 extending upwardly and hollowed out for the reception of a plunger valve member 56. An annular shoulder 57 is provided in the bore of the stem 55 upon which is seated a ring 58 supporting packing material 59 covered by a second ring 60. The upper end of the plunger 56 is externally threaded to receive internal threads of a cap 61. A spring 62 is positioned between the lower end of the cap 61 and the upper ring 60. When this spring is under compression, it serves to hold the plunger 56 upwardly relative to member 51 and at the same time it serves to compress the packing material 59 to prevent leakage around the plunger 56. The bore of the plunger 56 is provided with a groove 64 in which slides a pin 65 extending from the cap 61. This construction insures proper alignment of the cap and the plunger and prevents separation of the cap from the plunger.

That portion of the plunger 56 below the shoulder 57 is hollowed out as at 66 and a number of orifices 67 extend through the wall of the plunger affording communication between the exterior of the plunger and the hollowed out interior thereof. The plunger 56 is provided with a gasket seat 68 extending outwardly therefrom in which is positioned gasket 69 for contact with the annular valve seat 70 formed integrally with the member 51. The lower end of the plunger 56 is externally threaded below a shoulder 71 which shoulder 71 serves as a retainer for a gasket 72 held in place by means of a threaded sleeve 74. The action of this gasket will be explained later.

Slidable within the cylinder 54 and relative to the plunger 56 is a valve cage made up partly of a central member 75 having a smooth bore within which the gasket 72 slides. The lower end of the member 75 is externally threaded as at 76 for the reception of a gasket retainer 77 which is internally threaded. This gasket retainer has a number of depending prongs 78 of such size and arrangement as to fit within the valve seat 28 to aid in aligning the valve cage. The member 75 has a horizontal extension 79 recessed to receive the gasket 80 held in the recess by means of the retainer 77.

Extending upwardly from the extension 79 is a cylindrical wall 81 provided with a plurality of apertures 82. A screen 84 is so formed as to be positioned against the inner wall of the upright cylinder 81. The upper end of the member 75 is externally threaded as at 85 to receive the threads of a gasket retainer 86. This retainer serves to hold a gasket 87 between the upper edge of the cylinder 81 and the retainer. The gasket is shaped as shown to bear against the inner wall of the cylinder 54 to prevent leakage at such joint.

The cover plate 11 is provided with an opening 90 concentric with the openings 27 and 50, the wall of which opening is threaded for the reception of the threads on the end of a sleeve 91. Slidable through the sleeve 91 is a pusher 92 having a cylindrical portion 94 fitting closely within the sleeve 91. The exterior of the lower end of the cylinder portion 94 is externally threaded to receive an external ring 95 which can bear against the lower end of the sleeve 91 to act as a stop against excessive upwardly movement of the pusher. The inner wall of the cylindrical portion 94 is screw threaded throughout its length for the reception of a screw threaded plug 96. The pusher 92 has a depending flange 97 spaced from the cylindrical portion 94 a distance sufficient to permit the flange to fit closely around the sleeve 91 when the pusher is depressed.

The gasket retainer 86 is provided with a small orifice 100 passing entirely therethrough. A headed member 101 passes through the retainer 86 adjacent to the orifice 100 and is locked in place as shown. A part of the head 102 is cut away so that the member 101 can be rotated to partially or entirely close the orifice 100. The member 51 is provided with a threaded orifice 104 through which passes a screw 105 terminating in a tip 106. The member 51 is hollowed out to receive packing material 107 compressed by a washer 105 and a nut 109 threaded on the screw 105.

The operation and use of the device is substantially as follows: The casing 10 is designed to be embedded in a floor with the top of the casing substantially flush with the top of the floor, and, if desired, with the cover plate 11 raised above the floor level an amount equal only to the thickness of the cover plate. Of course, if desired, the casing can be embedded in the floor with the top thereof below the floor level an amount sufficient to permit the top of the plate 11 to be flush with the floor surface, in which event the edges of the plate 11 will not be bevelled. In making the installation a supply conduit, such as a water pipe, will be connected to the inlet while a conduit leading to a plumbing fixture which is to be supplied with water under control will be connected to the outlet. If the pressure of the water supply is higher than is desirable in the plumbing fixture, the valve seating on the seat 25 can be adjusted to compensate for variations in pressure. If the pressure is high and it is desired to reduce the pressure, the stem 40 is turned so that the spring 48 is put under more than normal compression. As a result of this compression the valve plate 44 and the gasket 46 will be lifted only when the pressure reaches a certain predetermined amount. Water can then flow from the inlet chamber 16 into the intermediate chamber 21. The valve cage in this intermediate chamber 21 is normally in position in which the valve gasket 80 is seated on the seat 28. In this position the water enters the orifices 80 into the interior of cylinder 81 from which it may pass through the orifice 100 into the interior of the cylinder 54. It cannot escape from the chamber so formed due to the seating of the gasket 69 on the valve seat 70.

If it is desired to supply water to the plumbing fixture the pusher 92 is depressed. As a result of such movement the plug 96 in this downward passage forces the plunger 56 downwardly uncovering the valve seat 70. Water from the chamber in the cylinder 54 can then escape through the orifice 67 downwardly through the rod 56 into the outlet chamber 22. As soon as the equalizing pressure in the chamber of the cylinder 54 is relieved, pressure of water entering the chamber of the cylinder 81 serves to raise the valve cage and unseat the gasket 80 from the valve seat 28. Water then flows freely from the intermediate chamber 21 into the outlet chamber 22 from which it passes to the plumbing fixture.

When pressure forcing the pusher 92 downwardly is released, the spring 62 forces the cap 61 upwardly carrying the plug 96 and the pusher 92 along with it. This upward movement eventually causes seating of the gasket 69 on the seat 70 preventing a further flow of water from the chamber of cylinder 54 through the orifices 67. The valve cage remains open however until sufficient water passes from the cage through the orifice 100 into the chamber of cylinder 54. As the water passes through the orifice 100 through the chamber, the pressure on each side of the gasket retainer 86 is gradually equalized so that the valve cage is moved downwardly gradually until when the pressure on each side of the retainer 86 becomes equalized, the valve cage is down to its normal position preventing further passage of water from the intermediate chamber to the outlet chamber.

It will be evident that adjustments of various characters can be made in the construction shown. As before stated, the pressure of water supply to the plumbing fixture can be determined accurately by operation of the pressure reduction or control valve between the inlet and intermediate chambers. The height to which the valve cage can be lifted can be regulated by adjustment of the screw 105, the tip 106 serving as a stop for upward movement of the valve cage. By adjustment of the plug 96 contact between the pusher 92 and the cap 61 can be regulated, but preferably, adjustment is made to correspond to the showing of the drawing.

Another feature of the construction illustrated resides in the fact that all moving and operating parts which are subject to wear can be readily removed from the casing and replaced by other parts. It should be observed that the seat of the reducing valve can be removed and replaced; the entire mechanism of the reducing valve can be removed and new parts substituted if desired; the seat of the main valve can be removed for repairs or replacements; the valve cage together with its retainer cylinder are also capable of removal, repair or replacement. Access to all parts is provided by simply removing the cover plate 11.

From the foregoing it will be seen that the present invention provides a unitary valve assembly capable of many uses and providing advantages over prior constructions in that even though the casing is permanently installed in a floor yet all parts are accessible at any time. The assembly provides the advantage that its operation can be accurately controlled, compensation for differences in water pressures at different installations being possible in the manner set forth hereinbefore.

Since the invention can be modified considerably beyond the illustrated embodiment, any limitations to be imposed thereupon are to be only those set forth in the following claims.

I claim:

1. In a valve assembly, an open top casing, partitions in said casing dividing the same into upper and lower compartments and dividing the lower compartment into inlet, intermediate, and outlet chambers, the partitions in the lower compartment being provided with openings affording communication between the inlet and intermediate chambers and between the intermediate and outlet chambers, valve seats removably secured in said openings, the partitions dividing the casing into upper and lower compartments being provided with valve mechanism openings concentric with the valve seat openings, said valve mechanism openings being of such size as to permit passage of the respective valve seats therethrough, fluid pressure opened valve mechanism removably secured in one of said valve mechanism openings, and self-closing valve mechanism removably positioned in the other of said valve mechanism openings.

2. In a valve assembly, an open top casing, partitions in said casing dividing the same into upper and lower compartments and dividing the lower compartment into inlet, intermediate, and outlet chambers, the partitions in the lower compartment being provided with openings affording communication between the inlet and intermediate chambers and between the intermediate and outlet chambers, valve seats removably secured in said openings, the partitions dividing the casing into upper and lower compartments being provided with valve mechanism openings concentric with the valve seat openings, said valve mechanism openings being of such size as to permit passage of the respective valve seats therethrough, fluid pressure opened valve mechanism removably secured in one of said valve mechanism openings, and self-closing valve mechanism removably positioned in the other of said valve mechanism openings, a cover plate for said casing and a valve actuating member extending through said cover plate.

3. In a valve assembly, an open top casing, partitions in said casing dividing the same into upper and lower compartments and dividing the lower compartment into inlet, intermediate, and outlet chambers, the partitions in the lower compartment being provided with openings affording communication between the inlet and intermediate chambers and between the intermediate and outlet chambers, valve seats removably secured in said openings, the partitions dividing the casing into upper and lower compartments being provided with valve mechanism openings concentric with the valve seat openings, said valve mechanism openings being of such size as to permit passage of the respective valve seats therethrough, fluid pressure opened valve mechanism removably secured in one of said valve mechanism openings, self-closing valve mechanism removably positioned in the other of said valve mechanism openings, said pressure opened valve mechanism comprising in part a member to seat on said valve seat, yielding means for normally forcing said member toward said valve seat, and means for varying the pressure forcing said member toward said valve seat.

4. In a valve assembly, an open top casing, partitions in said casing dividing the same into upper and lower compartments and dividing the lower compartment into inlet, intermediate, and outlet chambers, the partitions in the lower compartment being provided with openings affording communication between the inlet and intermediate chambers and between the intermediate and outlet chambers, valve seats removably secured in said openings, the partitions dividing the casing into upper and lower compartments being provided with valve mechanism openings concentric with the valve seat openings, adjustable fluid pressure opened valve mechanism removably secured in one of said valve mechanism openings, means extending into said upper compartment for adjusting said mechanism, and self-closing valve mechanism removably positioned in the other of said valve mechanism openings, said self-closing valve mechanism comprising in part a stationary cylinder, a valve cage freely slidable therewithin, a secondary valve stem movable relative to said cylinder and said cage to open and close a secondary valve, said valve cage having a member for contact with the valve seat in the opening between the intermediate and outlet chambers.

5. In a valve assembly, an open top casing, partitions in said casing dividing the same into upper and lower compartments and dividing the lower compartment into inlet, intermediate, and outlet chambers, the partitions in the lower compartment being provided with openings affording communication between the inlet and intermediate chambers and between the intermediate and outlet chambers, valve seats removably secured in said openings, the partitions dividing the casing into upper and lower compartments being provided with valve mechanism openings concentric with the valve seat openings, adjustable fluid pressure opened valve mechanism removably secured in one of said valve mechanism openings, means extending into said upper compartment for adjusting said mechanism, and self-closing valve mechanism removably positioned in the other of said valve mechanism openings, said self-closing valve mechanism comprising in part a stationary cylinder, a valve cage freely movable in said cylinder and closing one end of the cylinder to form an equalizing chamber, a secondary valve controlling outlet of liquid from said equalizing chamber, said cage having an adjustable orifice providing an inlet for said equalizing chamber, said secondary valve being manually opened, and means for positively closing said secondary valve when the opened pressure is released.

OTTO A. SORENSEN.